Jan. 15, 1946.  R. SCOTT  2,393,197
REMOTE READING TEMPERATURE INSTRUMENT
Filed Dec. 20, 1944
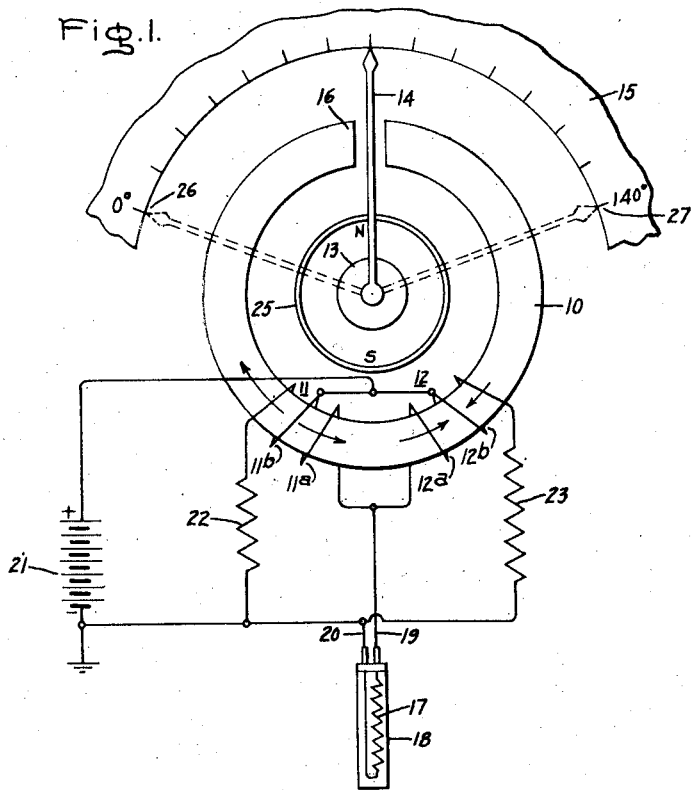
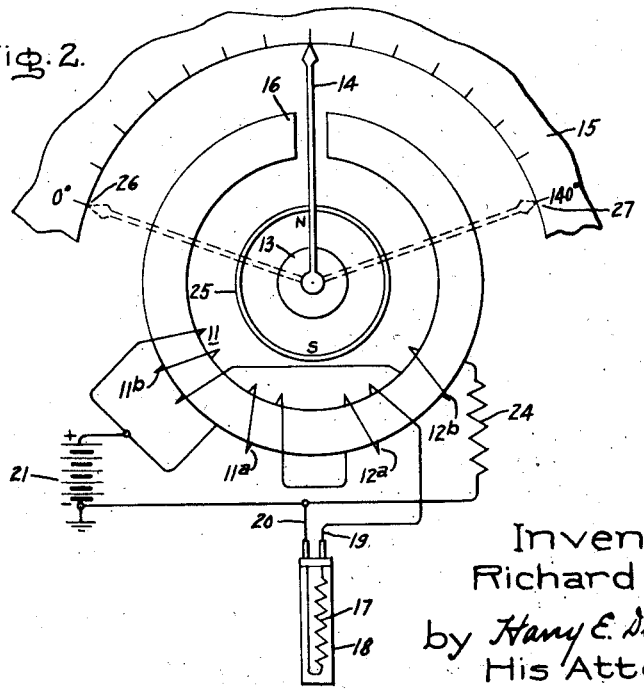
Inventor:
Richard Scott,
by Harry E. Dunham
His Attorney.

Patented Jan. 15, 1946

2,393,197

UNITED STATES PATENT OFFICE 2,393,197

REMOTE READING TEMPERATURE INSTRUMENT

Richard Scott, Toronto, Ontario, Canada, assignor to General Electric Company, a corporation of New York Application December 20, 1944, Serial No. 568,970
In Canada March 22, 1944

1 Claim. (Cl. 172—239)

My invention relates to electrical measuring instruments and particularly to direct current telemetering systems and apparatus.

The object of my invention is to provide a reliable and accurate arrangement which will indicate variations in a resistance which may be at a remote point.

Another object of my invention is to provide an electrical temperature measuring apparatus having a transmitter which will not be affected by vibrations.

Another object of my invention is to provide a measuring instrument which will readily be adapted to give full scale deflection for any desired range of resistances to be measured.

Further objects and advantages of my invention will become apparent from the following detail description of my invention taken in connection with the accompanying drawing in which Fig. 1 is a diagrammatic showing of one form of current responsive instrument to which my invention has been applied; Fig. 2 is a showing similar to Fig. 1 of a modified form of my invention.

On the drawing I have shown somewhat diagrammatically the magnetic structure of the type of current responsive instrument described in United States Letters Patent No. 2,274,451 of February 24, 1942. An annular stationary magnetic field structure 10 of highly permeable material and having an air gap 16 is provided with windings 11 and 12 which are energized by direct current so that the direction of the flux lines in the member 10 are opposite. The lines of force of the resultant magnetic field assume a direction across the annulus dependent on the relative magnitudes of the ampere turns in the windings. A cylindrical magnet 13 is rotatably mounted on its cylindrical axis, coaxially with the annulus 10. The magnet is of high coercive force magnetic material, a suitable example of which is described in the above-mentioned patent, and is magnetized along a diameter of the cylinder, the direction of the magnetic axis being indicated by the characters N and S. The rotor 13 carries a pointer 14 cooperating with a scale 15 which may be suitably graduated. As the magnet is inductively related to the windings 11 and 12, its magnetic axis lines up with the lines of force of the resultant field from the windings 11 and 12. The windings 11 and 12 are preferably spaced an equal distance from the gap 16 and when they have an equal number of ampere turns the magnet 10 lines up with its axis in line with the gap. The length of the scale 15 can be adjusted by moving the windings 11 and 12 towards and away from each other, the farther they are from the gap the greater the length of the scale. It will be apparent that the maximum deflection of the pointer to the left will occur when the winding 12 is deenergized and the winding 11 energized, and the maximum deflection to the right will occur when the winding 11 is deenergized and the winding 12 is energized. A damping ring 25 which may be of copper or other current conduct material is interposed between the magnetic structure 10 and the rotor magnet 13.

In accordance with my invention I provide a resistor having a high temperature coefficient of resistance, preferably negative, and so connect it and a source of direct current energy to the windings that at one end of the range of resistance to be measured one of the windings predominates over the other and the predominance of this winding diminishes as the temperature to be measured moves along the range to be covered.

Referring to Fig. 1, the windings 11 and 12 are each made up of two coils indicated as 11a, 11b and 12a, 12b respectively. A resistor made of material having a high temperature coefficient of resistance in the range of temperatures to be measured is shown at 17. I have found a carbon resistor which has a high negative coefficient to be a suitable resistance and the description which follows applies to such a resistor. The resistor may be enclosed in a bulb 18 adapted for application to a part whose temperature is to be measured and is connected to the remainder of the apparatus, which may be located elsewhere, by a single pair of wires 19 and 20.

As shown in Fig. 1, the coils 11a and 12a are connected in parallel through the resistor 17 with a source of direct current which I have indicated as a battery 21. The coil 11b is connected across the battery through a resistor 22 and the coil 12b is connected across the battery through a resistor 23. The coils 11a and 11b, forming one winding, are arranged in bucking relation to one another and the coils 12a and 12b, forming the other winding, are also arranged in bucking relation to one another. For a mid-scale deflection the direction and magnitude of the fluxes produced by the coils may be indicated by the arrows adjacent such coils. While the coils of each winding are shown displaced for clarity, they will be wound one over the other and occupy the same position. The centers of the two windings will be spaced less than 180 degrees on the solid part of the core, preferably equally distant from the air gap

16. The resistor 23 is chosen of such a magnitude that the flux produced by the current flowing in the coil 12b balances the flux produced by the current flowing in the coil 12a when the temperature of the resistor 17 is at the low end of the range to be measured. The resistor 22 is chosen of such a magnitude that the flux produced by the current flowing in the coil 11b balances the flux produced by the current flowing in the coil 11a when the temperature of the resistor 17 is at the high end of the range to be measured. When the temperature of the resistor 17 is at the low end of the range, the magnetic field to which the rotor is subjected is the resultant of the fluxes produced by the coils 11a and 11b of winding 11, the resultant flux of the winding 12 being zero, and the rotor lines up in this magnetic field with the pointer at the low end of the scale as indicated at 26. As the temperature of resistor 17 rises, its resistance decreases and consequently the current through the coils 11a and 12a increases. The resultant flux of the winding 11 now decreases because there is a decrease in the difference between the constant flux of coil 11b and the increase of the flux of 11a. At the same time the resultant flux of winding 12 is correspondingly increasing because the flux of coil 12a is becoming increasingly greater than the constant flux of coil 12b. When the temperature of the resistor 17 reaches the upper end of the range to be measured, the current through the coil 11a has increased to the point where the flux produced thereby balances the flux produced by the coil 11b and the resultant flux of the winding 11 is zero. The position of the rotor 13 is now determined wholly by the flux from the winding 12 and the pointer reaches a position at the upper end of the scale as indicated at 27. The winding 12 has, therefore, a net flux which increases from zero to a maximum and the winding 11 has a net flux which decreases from a maximum to zero as the temperature of the resistor 17 varies from the lower end of the range to be measured to the upper end.

It may be convenient to centertap windings 11 and 12 providing equal coils 11a, 11b, 12a and 12b. In this event the resistor 22 and its leads will be equal to the resistance of the resistor 17 and its leads at the lower end of the range, and the resistance of the resistor 23 and its leads will have a resistance equal to the resistance of 17 and its leads at the upper end of the range. However, it is the ampere turns in the coils 11a, 11b, 12a and 12b which are effective and the selection of the number of turns in and the resistance of these coils and the magnitude of their calibrating resistances 22 and 23 is a matter of selection depending on the circumstances of the case.

It is apparent the receiving instrument described may be adapted for full scale readings, for any temperature range of the resistor 17 desired, by suitably adjusting the value of the resistors 22 and 23 and scale readings for the particular circumstances.

Referring now to Fig. 2 which discloses a modified form of my invention and in which similar parts are identified by the same reference characters, the coils 11a and 11b are arranged in bucking relation and the coils 12a and 12b are also arranged in bucking relation. The coils 11a and 12a are connected in series with each other and with a temperature variable resistor 17 across the battery 21. The coils 11b and 12b are also connected in series with each other and with a compensating resistor 24 across the battery 21. The number of turns in the coil 11b is greater than the number of turns in its associated coil 11a in the winding 11, and the number of turns of the coil 12a is greater than the number of turns in its associated coil 12b in the winding 12. The ampere turns of the coils 11b and 12b with respect to the ampere turns of their respective associated coils 11a and 12a is such that when the temperature of the resistor 17 is at the lower end of the range the resultant flux from the winding 12 is zero, and the flux in the winding 11 moves the rotor magnet to the lower end of the scale, and is such that when the temperature of the resistor 17 is at the upper end of the range, and hence its resistance lower, the resultant flux from the winding 11 is zero and the flux from winding 12 moves the rotor magnet to the upper end 27 of the scale.

As in the modification of Fig. 1, the resultant flux in the winding 11 opposes the resultant flux in the winding 12 creating a magnetic field traversing the magnet rotor 13 and causing rotation thereof from a position at the lower end of the scale where the winding 11 predominates to the other end of the scale where the winding 12 predominates.

In the modification of Fig. 2, I have shown a two wire connection to the transmitting instrument. It is apparent that if desired a single wire to the transmitter may be used connected to one end of the resistor 17. In this case the other end of the resistor 17 is grounded and the appropriate end of the battery and the resistors 22 and 23 are also grounded in any appropriate manner, as is well known in the art.

While for purposes of description of both modifications I have described the proportions of the windings and resistors as such that one of the windings is completely neutralized at the ends of the scale, it is apparent that the principles of my invention do not require such complete neutralization, but it is resorted to to get as wide a scale range as possible for a given spacing of the windings 11 and 12 on the magnetic structure 10.

While in both modifications I have shown and described the transmitting instrument as a resistor having a high temperature coefficient of resistance which is useful for measuring temperature, it is apparent that the receiver would also be useful to give an indication of the change in resistance of a resistor located at a remote point regardless of how the change in the resistance is brought about, for example, one of the connections to the resistor 17 may be made to a movable contact whose position on the resistor is determined by a variation in the condition to be measured as represented in the above-mentioned patent.

The parallel arrangement of the coils of the windings across the supply source in both modifications compensates for any variation in the potential of the source 21 and largely compensates for variations of ambient temperature at the receiver.

The temperature indicating telemetric system described employs a transmitter which may be easily applied to any desired part and has no movable parts and is completely vibration proof.

What I claim as new and desire to secure by Letters Patent of the United States is:

A receiver for a direct current telemetering system comprising an annular magnetic core with an air gap therein, a magnetic rotor substantially concentrically mounted within said core and permanently magnetized transversely to its axis of rotation and the axis of said core, a pair of windings linking said core, said windings being spaced with their centers less than 180 degrees along the solid portion of said core and substantially equally distant from the air gap therein, said windings each comprising a pair of coils connected in bucking relation, and a direct current source of supply connected to supply one coil of each winding in proportion to the voltage of said source, and to supply the remaining coils of each winding in proportion to a variable to be indicated by such receiver such that at one end of the range of operation of the receiver the resultant flux of one winding is zero and the resultant flux of the other winding is in a given direction in the core, and at the other end of the range of operation the resultant flux of the last-mentioned winding is zero and the resultant flux of the first-mentioned winding is in the opposite direction in the core.

RICHARD SCOTT.